July 18, 1939. D. S. HOOVER 2,166,296
STEERING WHEEL ATTACHMENT
Filed Aug. 1, 1938 2 Sheets-Sheet 2
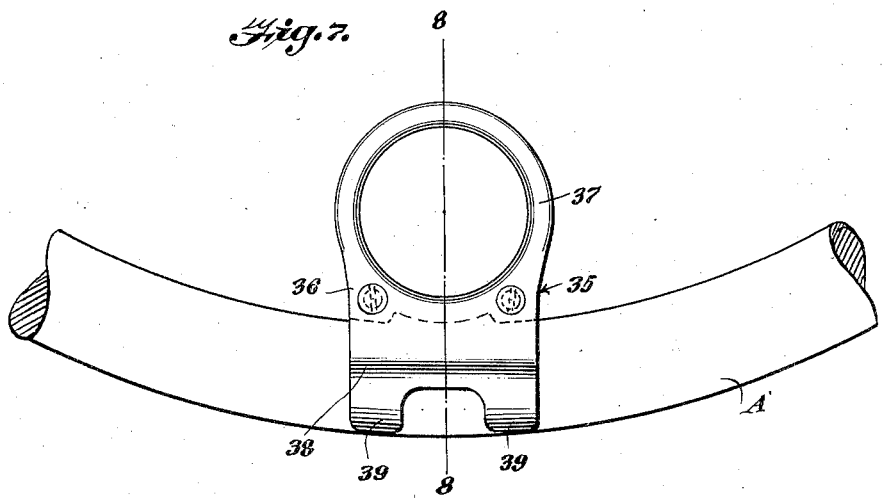
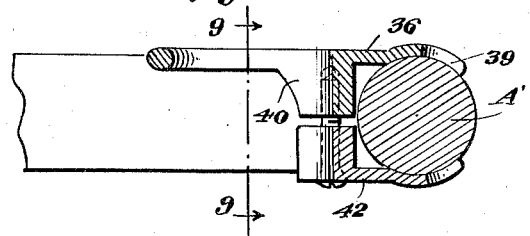
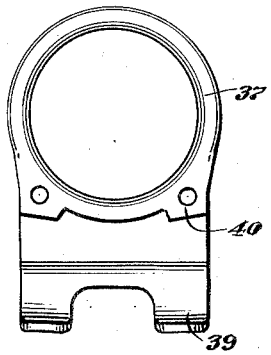
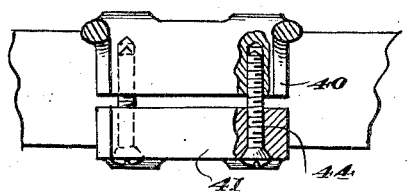
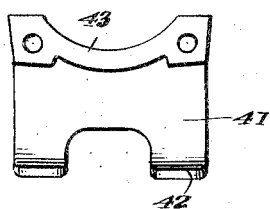
Inventor
DANIEL S. HOOVER Patented July 18, 1939

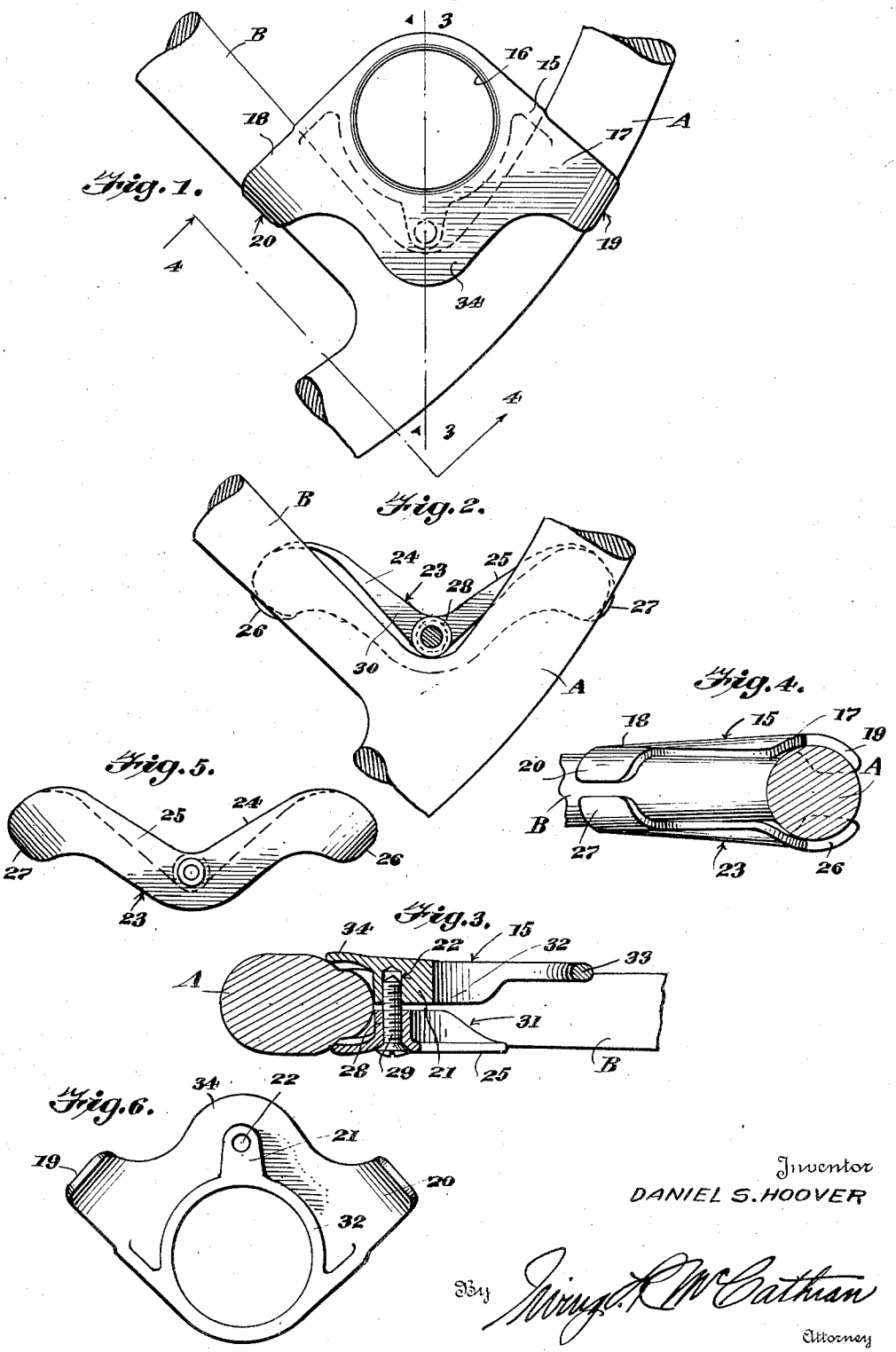

2,166,296

UNITED STATES PATENT OFFICE 2,166,296

STEERING WHEEL ATTACHMENT

Daniel S. Hoover, Mansfield, Ohio

Application August 1, 1938, Serial No. 222,546

9 Claims. (Cl. 74—557)

This invention relates to steering wheel attachments, and has for one of its objects the production of a simple and efficient means adapted to be attached to a steering wheel of an automobile and the like, for facilitating the turning or spinning of the steering wheel.

A further object of this invention is the production of a simple and efficient thumb-engaging grip for a steering wheel of a vehicle, and the like, which grip may be easily and quickly secured to or removed from the steering wheel without injury to the steering wheel or detracting from the appearance thereof.

Other objects and advantages of this invention will appear throughout the following specification and claims.

In the drawings:

Figure 1 is a top plan view of a fragment of a steering wheel, showing one of the grip devices secured thereto;

Figure 2 is a view similar to Figure 1, with the thumb-engaging plate removed, and the securing screw being shown in section;

Figure 3 is a sectional view taken on line 3—3 of Figure 1;

Figure 4 is a sectional view taken on line 4—4 of Figure 1;

Figure 5 is a bottom plan view of the lower clamping plate;

Figure 6 is a bottom plan view of the thumb-engaging plate;

Figure 7 is a top plan view of a modified type of thumb-engaging grip;

Figure 8 is a sectional view taken on line 8—8 of Figure 7;

Figure 9 is a sectional view taken on the general line 9—9 of Figure 8, with certain other parts broken away;

Figure 10 is a bottom plan view of the thumb-engaging grip shown in Figure 7;

Figure 11 is a top plan view of the bottom clamping plate shown in the form of the device illustrated in Figures 7 and 8.

By referring to the drawings, it will be seen that A designates a steering wheel rim which is supported by suitable spokes B. In order to provide efficient means for gripping the steering wheel for the purpose of turning or spinning the same, I have devised a thumb-grip means which may be readily attached to or detached from a steering wheel without injury to the wheel or marring its appearance, the grip being economically constructed and consisting of a minimum number of parts.

By referring to Figures 1 to 6 in detail, it will be seen that 15 designates the thumb-engaging plate which is provided with a thumb-receiving aperture 16 and oppositely diverging anchoring arms 17 and 18. The arm 17 is provided with a downwardly curved lip 19, and the arm 18 is provided with a downwardly curved lip 20, the arm 17 and lip 19 being adapted to engage the rim A and conform to the contour thereof for providing a snug fit. The arm 18 and the lip 20 engage the spokes B and conform to the contour thereof, as shown in detail in Figure 4. The thumb engaging plate 15 is so constructed as to fit within the crotch formed between the spokes B and the rim A, and to provide an efficient means whereby the thumb or fingers of the driver may be easily inserted through the aperture 16 of the plate 15 adjacent the junction of the spokes B and the rim A, and thereby provide an efficient grip for facilitating the spinning or rotation of the steering wheel. The aperture 16 is preferably circular so as to allow a proper movement of the wheel without injury to the thumb or fingers of the operator and allow the wheel to be easily spun without being retarded in its movement. The thumb or fingers of the operator may easily rotate within the aperture 16. The thumb-engaging plate 15 is provided with a depending lug 21 at a point intermediate the arms 17 and 18 which lug is provided with an internally threaded socket 22 extending from its under side.

A clamping plate 23 is used in conjunction with the thumb-engaging plate 15 and comprises oppositely diverging arms 24 and 25. These arms 24 and 25 are provided with upwardly curved lips 26 and 27 respectively at the ends thereof, which lips are adapted to conform to the contour of the under faces of the rim A and spokes B, in a manner as illustrated in Figure 4. This clamping plate 23 is provided with an upwardly extending lug or boss 28 through which is threaded a clamping screw 29, the clamping screw 29 also fitting in the socket 22. The lug 28 is located at a point to fit within the crotch formed between the spokes B and the rim A, as shown in detail in Figure 2, the parts being arranged to snugly fit in position in order to hold the plate 15 in anchored relation with respect to the steering wheel. The screw 29 by being tightened will draw the clamping plate 23 in firm engagement with the rim A and spokes B along the under face thereof, and this clamping plate 23 is provided with a thickened rib portion 30 upon its upper face to reinforce the bracing plate 23 the rib portion 30 fitting in the crotch portion formed between the spokes and rim and converging in a manner towards its ends, as indicated at 31, to conform to the contour of the spokes and rim. The thumb-engaging portion 15 is also provided with a similar rib or web portion 32 upon its under face surrounding a portion of the aperture 16, the thumb-engaging portion 15 having a band 33 projecting inwardly of the steering wheel between the spokes B and rim A with its axis at approximately 45° to the spoke B, as shown in Figure 1.

Although the present invention has been designed for engagement by the thumb, it should be understood that the same may be engaged by any finger of the hand without departing from the spirit of the invention.

From the foregoing description it will be seen that a very simple and efficient thumb-grip device has been provided to facilitate the operation or spinning of a steering wheel and it should be understood that the structure of this device will provide a very simple and quickly detachable thumb-grip portion for the wheel.

As shown in Figure 1, the thumb-grip portion 15 is provided with a central overhanging curved flange 34 located intermediate the arms 17 and 18 for partly overhanging the rim A and the spoke B at their point of junction, the clamping plate 23 also partly underlying the rim A and spoke B at their junction, as shown in Figure 2.

In Figures 7 to 11, I have shown a modified form of the invention wherein I have provided a thumb-engaging member 35 which is especially designed for attachment to the rim A' at any point within its length such for instance, as a point intermediate the spokes. This thumb-engaging member 35 comprises a thumb-engaging plate 36 having a thumb-engaging ring 37 and a rim-engaging portion 38, which rim-engaging portion 38 is provided with a plurality of downwardly curved lips 39, as shown in detail in Figure 8. The thumb-engaging portion 36 is provided with a depending rib 40, as shown in Figures 8 and 9, which extends downwardly adjacent the inner face of the rim A'.

A clamping plate 41 is adapted to engage the under face of the rim A' and is provided with a pair of upwardly curved lips 42 which conform to the transverse contour of the rim A'. This plate 41 is provided with an upstanding rib 43. Clamping bolts 44 are passed through the rib 43 and the rib 40 for clamping the plate 36 and the plate 42 in gripping engagement upon the rim A'. The ring 37 extends inwardly of the rim A' and also extends approximately flush with the upper face of the rim A'. The band 33 in the form shown in Figures 1 to 6 also extends approximately flush with the rim A since it is not desired that the device extend for a material distance above the wheel.

It should be understood that certain detail changes in the mechanical construction may be employed without departing from the spirit of the invention, so long as such changes fall within the scope of the appended claims.

Having described the invention, what is claimed is:

1. A steering wheel attachment of the class described comprising a detachable digit-engaging member having a digit-receiving aperture formed therein adapted to receive a thumb, finger and the like, and clamping means for detachably securing the digit-engaging member to a steering wheel.

2. A steering wheel attachment of the class described comprising a digit-engaging plate and a clamping plate, means engaging the clamping plate and digit-engaging plate for detachably holding the same in engagement with a steering wheel, and the digit-engaging plate having a circular digit-receiving aperture formed therein and projecting beyond the clamping plate and adapted to receive a thumb, finger and the like.

3. A steering wheel attachment of the class described comprising a thumb-engaging plate adapted to engage one face of a steering rim and spoke, a clamping plate being adapted to engage the opposite face of a steering rim and spoke, means for clamping the clamping plate in clamped engagement with opposite faces of the rim and spoke, and said thumb-engaging plate having an inwardly extending portion adapted to fit between the rim and spoke of a wheel, the thumb-engaging portion having a circular aperture extending in line with the transverse axis of the spoke and rim.

4. A steering wheel attachment of the class described comprising a thumb-engaging plate adapted to engage one face of a steering rim and spoke, a clamping plate being adapted to engage the opposite face of a steering rim and spoke, means for clamping the clamping plate in clamped engagement with opposite faces of the rim and spoke, said thumb-engaging plate having an inwardly extending portion adapted to fit between the rim and spoke of a wheel, the thumb-engaging portion having a circular aperture extending in line with the transverse axis of the spoke and rim, and reinforcing ribs formed upon the adjacent faces of the clamping plate and thumb-engaging plate.

5. A steering wheel attachment of the class described comprising a thumb-engaging plate adapted to engage one face of a steering rim and spoke, a clamping plate being adapted to engage the opposite face of a steering rim and spoke, means for clamping the clamping plate in clamped engagement with opposite faces of the rim and spoke, said thumb-engaging plate having an inwardly extending portion adapted to fit between the rim and spoke of a wheel, the thumb-engaging portion having a circular aperture extending in line with the transverse axis of the spoke and rim, said thumb-engaging plate having oppositely diverging arms terminating in depending lips adapted to conform to the contour of a spoke and rim for facilitating the holding of the thumb-engaging plate in engagement with a rim and spoke.

6. A steering wheel attachment of the class described comprising a thumb-engaging plate adapted to engage one face of a steering rim and spoke, a clamping plate being adapted to engage the opposite face of a steering rim and spoke, means for clamping the clamping plate in clamped engagement with opposite faces of the rim and spoke, said thumb-engaging plate having an inwardly extending portion adapted to fit between the rim and spoke of a wheel, the thumb-engaging portion having a circular aperture extending in line with the transverse axis of the spoke and rim, said thumb-engaging plate having oppositely diverging arms terminating in depending lips adapted to conform to the contour of a spoke and rim for facilitating the holding of the thumb-engaging plate in engagement with a rim and spoke, said clamping plate having upturned lips at the ends thereof conforming to the contour of a spoke and rim.

7. A steering wheel attachment of the class described comprising a thumb-engaging plate adapted to engage one face of a steering rim and spoke, a clamping plate adapted to engage the opposite face of a steering rim and spoke, means for clamping the clamping plate in clamped engagement with opposite faces of the rim and spoke, said thumb-engaging plate having an inwardly extending portion adapted to fit between the rim and spoke of a wheel, the thumb-engaging portion having a circular aperture extending in line with the transverse axis of the spoke and rim, said thumb-engaging plate and said clamping plate having internally threaded portions, and a clamping screw engaging said portions for drawing the plates together.

8. A steering wheel attachment of the class described comprising a finger-engaging plate having an inwardly extending thumb-engaging ring, said plate having downwardly curved rim-engaging lips adapted to conform to the contour of a steering wheel rim, a clamping plate adapted to engage the under face of a steering wheel and having upturned lips for contacting the under face of a steering wheel rim, and means for drawing the thumb-engaging plate and clamping plate together.

9. A steering wheel attachment of the class described comprising a thumb-engaging plate having an inwardly extending thumb-engaging ring, said plate having downwardly curved rim-engaging lips adapted to conform to the contour of a steering wheel rim, a clamping plate adapted to engage the under face of a steering wheel and having upturned lips for contacting the under face of a steering wheel rim, said thumb-engaging plate and clamping plate having rib portions extending toward each other, the rib portions having internally threaded aligned portions, and screws fitting in said internally threaded aligned portions for holding said plates in clamping engagement upon a steering wheel rim.

DANIEL S. HOOVER.